Dec. 15, 1953  A. R. LINDSAY  2,662,794
FINAL CONNECTION BETWEEN PREASSEMBLED UNITS
OF SELF-SUPPORTING AUTOMOBILE BODIES
Filed June 8, 1950  2 Sheets-Sheet 1

INVENTOR.
Alexander R. Lindsay
BY
Maurice A. Crews
ATTORNEY

Dec. 15, 1953 A. R. LINDSAY 2,662,794
FINAL CONNECTION BETWEEN PREASSEMBLED UNITS
OF SELF-SUPPORTING AUTOMOBILE BODIES
Filed June 8, 1950 2 Sheets-Sheet 2
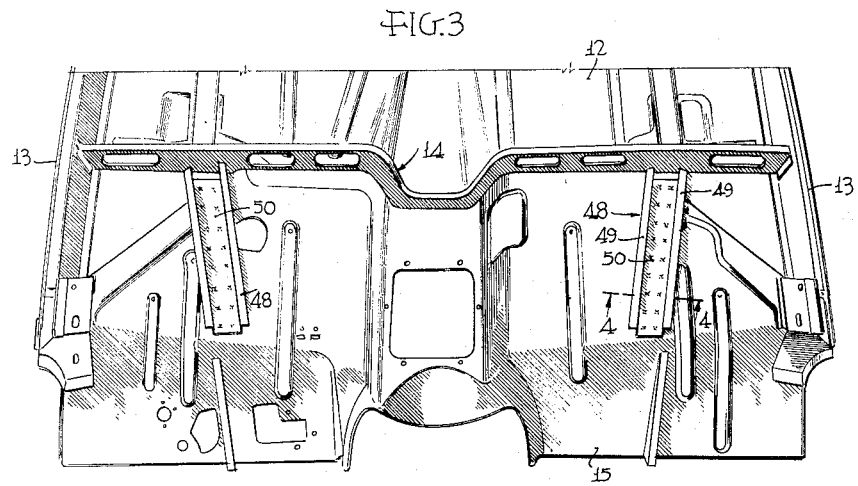
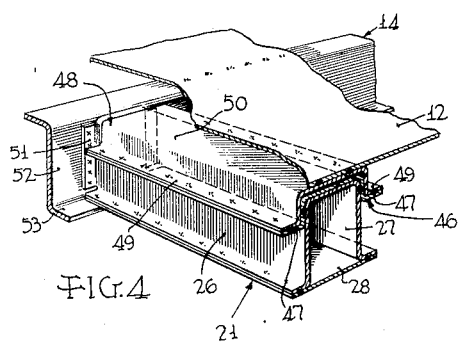
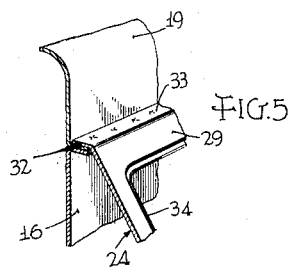
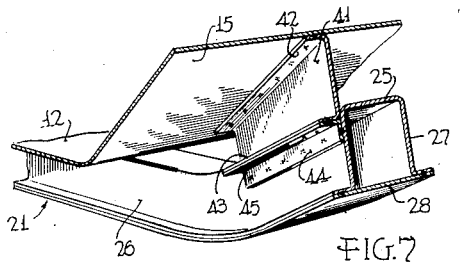
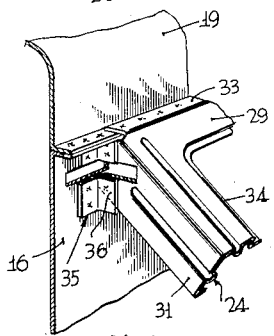
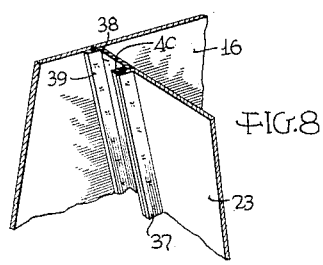
INVENTOR.
Alexander R. Lindsay
BY
Maurice A. Crews
ATTORNEY

Patented Dec. 15, 1953

2,662,794

UNITED STATES PATENT OFFICE 2,662,794

FINAL CONNECTION BETWEEN PREASSEMBLED UNITS OF SELF-SUPPORTING AUTOMOBILE BODIES

Alexander R. Lindsay, Detroit, Mich., assignor to The Budd Company, Philadelphia, Pa., a corporation of Pennsylvania Application June 8, 1950, Serial No. 166,889

10 Claims. (Cl. 296—28)

1

The invention relates to connections of a preassembled middle or body unit of a self-supporting automobile body with a pre-assembled end unit. More specifically, the invention relates to an automobile body in which a front unit including side sill members, wheel housings and braces, is secured by final assembly means to dash-board, toe-board, and underframe of the pre-assembled body proper.

Known constructions of this type, in which the units are made of sheet metal and connected by overlap welds, require reaching with the welding tools into the interior of the body unit.

The invention resides in such a formation of final assembly means on body unit and end unit, that the two units overlap each other throughout by projecting webs or flanges which are accessible for pincer type welding or similar connecting tools on the outside of the body units. This not only permits the body unit to be completely trimmed, painted, and equipped, but it also greatly facilitates the final assembly operation, doing away with the necessity of reaching with long-throated welding tools or the like from the outside into the inside of the body unit.

More specifically, the invention contemplates the pre-assembly of intermediate members with panels and framework of the body unit, such members providing outwardly accessible flanges or webs for overlapping engagement with and securement to mating parts of the end unit.

The objects, advantages, and features of the invention are more fully disclosed in connection with the following description of an embodiment which is illustrated in the attached drawing.

In the drawing:

Figure 3 is a fragmentary front underside perspective of the body floor, forming part of the main unit, prior to its connection with the front end unit, the adjoining parts of the main unit being omitted;

Figure 4 is a fragmentary perspective view, partly in section along line 4—4 of Figure 3, of the body underframe and of part of the front end unit connected therewith in final assembly;

Figure 1:
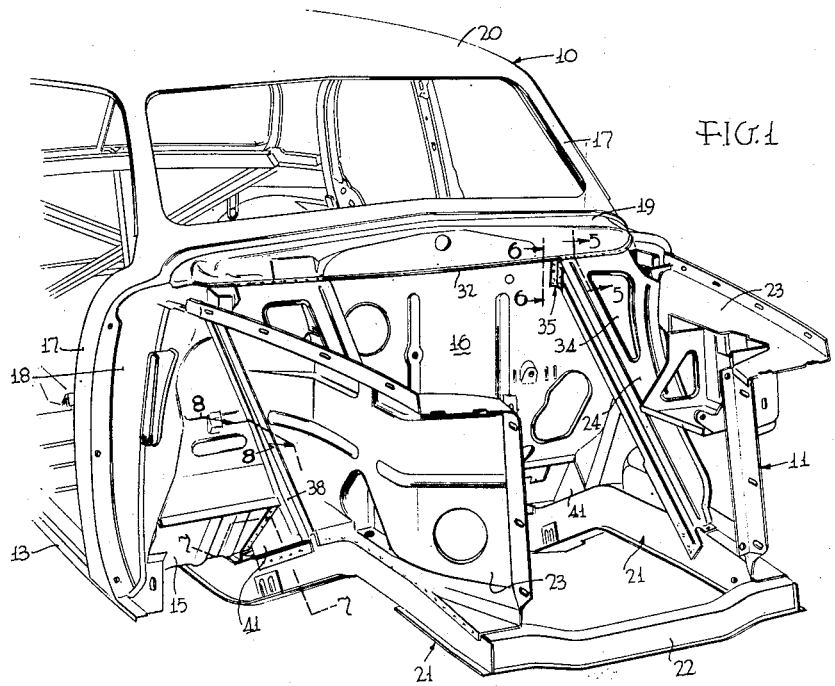
Figure 1 is a fragmentary three-quarter front perspective of the finally assembled body structure.

Figures 5 and 6 are fragmentary perspective sections along lines 5—5 and 6—6, respectively, of Figure 1, showing the final connection of an end unit brace with dash-board and cowl of the main unit;

Figure 7 is a fragmentary perspective and a section along line 7—7 of Figure 1, showing the final connection between toe-board of the main unit and a sill of the end unit; and Figure 8 is a fragmentary perspective and a section along line 8—8 of Figure 1, showing the final assembly connection between the dash-board of the main unit and wheel housing or side wall extension of the end unit.

The general construction of the body illustrated in the drawing is similar to the construction disclosed in the inventor's co-pending application Self-Supporting Bodies for Automobiles, Serial No. 29,458, filed May 27, 1948.

The body comprises main unit or body unit proper 10 and a front end unit 11. The main or body unit 10 presents the part for the passengers or for any other load and may be called the load body. The body unit 10 has as main structural elements a floor panel 12, side sills or threshold members 13, a transverse underfloor brace 14, toe-board 15, shroud panel or dash-board 16, front posts 17, cowl sides 18, cowl top 19, and roof 20. In rear of posts 17 and cross brace 14, the body may be of any desired design and structure compatible with its function as a self-supporting or so-called frameless body. The entire body proper or middle body unit 10 is pre-assembled, together with some additional members to be described later on, prior to its connection in final assembly with the separately pre-assembled front end unit 11.

Figure 2:
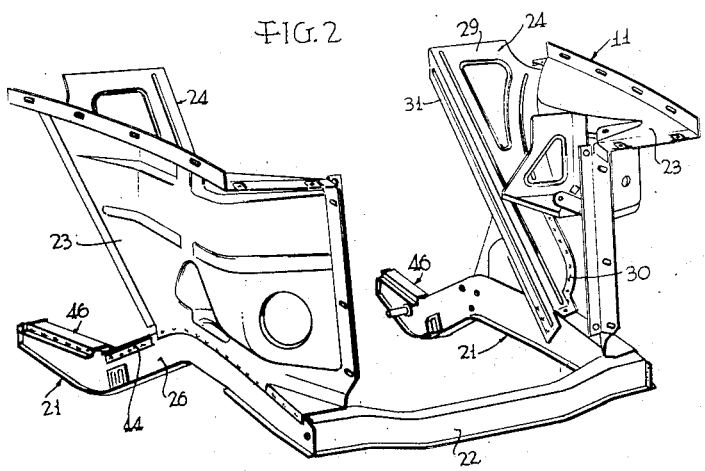
Figure 2 is a three-quarter front perspective of the pre-assembled front end unit prior to its final assembly with the main or middle body unit.

The front end unit 11, Figure 2, comprises side sill members 21, a forward cross brace 22, side wall extensions 23, forming wheel housings and motor compartment side walls, and upwardly and rearwardly inclined braces 24. This unit is adapted for connection to a front wheel supporting beam, for instance, in the manner disclosed in and forming the subject matter of simultaneously filed application running gear attachment for self-supporting automobile bodies, Stanley C. Vahey.

Each side sill 21 is a closed box-section formed of an inverted hat-section having a top wall 25, outer and inner side walls 26, 27, and of a bottom wall 28.

Each brace 24 has a transversely extending web 29 secured by marginal outer flange 30 to the respective wheel housing 23, and a downwardly depending inner reinforcing flange 31.

The front end unit is designed for the support of the motor and other parts of the driving gear, and for the attachment of radiator, fender, and other accessories. All of these parts are not shown; they may be of known construction and arrangement.

The final connection between the pre-assembled body proper 10 and the pre-assembled front end unit 11, which constitutes the heart of the invention, will now be described.

Shroud pan 16 and cowl top 19 of the body unit 10 are overlappingly connected by forwardly directed flanges 32. Web 29 of the front unit braces 24 overlaps in final assembly by its rear margin 33 the flanges 32 and is secured to them by spot welds. These welds can be made from the outside by reaching with the welding tools around the inner margins of the braces or by reaching through the openings 34 therein. See Figures 1, 5, and 6.

Shroud pan 16 has secured to it as part of the pre-assembled body unit a pair of angle sections 35. One leg 36 of each section projects forwardly, and the sections are so arranged that their legs 36 overlap the rear margins of flanges 31 of front-unit braces 24. Overlapping legs 36 and flanges 31 are secured to each other by spot welding, the welds again being accessible from the outside as apparent from Figure 6.

The rear margin of each wheel housing wall 23 terminates in a laterally outwardly directed flange 37 and is in final assembly spaced a short distance from the shroud pan or dash-board 16. The space between each flange 37 and shroud pan 16 is bridged by a member 38 preassembled through its flange 39 to the shroud pan 16 and extending downwardly therebeyond. Members 38 have along their front margins laterally outwardly directed flanges 40. Flanges 37 overlap flanges 40 in final assembly and are secured to them by spot welds. Figures 1 and 8 show that these flanges 37, 40 and the welds connecting them are conveniently accessible on the outside of main unit 10.

Toe-board 15 is pre-assembled with a pair of forwardly and downwardly projecting members 41 by means of flanges 42. The front margins of members 41 are secured to the rear margins of the members 38 (Figure 1). Members 41 have along their lower margins outwardly directed flanges 43 and are aligned with the outer walls 26 of the front unit sills 21. One leg 44 of an angle section is pre-assembled with each wall 26. The other legs 45 of the angle sections project outwardly and are overlappingly welded in final assembly to the flanges 43 of the body unit. Arms 44 are, of course, secured to sills 21 before their closure by bottom walls 28. Here again the final assembly welds between flanges 43 and legs 44 are accessible from the outside. See Figure 7.

The rear portions of the front sill members 21, which extend in final assembly beneath floor panel 12, have their top portion telescopingly received in shallow channel sections 46 provided with laterally projecting marginal flanges 47. Sections 46 have their side walls throughout spot welded to the side walls 26, 27 of sills 21 (Figures 2 and 4). A pair of somewhat wider and deeper channel sections 48 having marginal flanges 49 are preassembled with body unit 10 by spot welding bottom walls 50 to the underside of floor panel 12. See Figures 3 and 4. The size of channel sections 48 is such as to telescopingly fit over channel sections 46 of the front end unit and to overlap by their flanges 49 the flanges 47. Final connection is made by spot welding flanges 47 and 49 together, which for this operation are accessible from the outside. See Figure 4. It will be noted that here as at other locations the final assembly flanges are spaced from the panel to make room for the weld electrodes (not shown).

The rear ends of the sills 21 have their side walls provided with flanges 51 which overlap and are spot welded in final assembly to the vertical web 52 of brace 14. Bottom walls 28 and lateral flanges of sills 21 have their rear ends spot welded to the lower arm 53 of brace 14. The form of brace 14 and its relation to the flanges and the bottom wall of sills 21 are such that the final assembly welds are accessible without reaching into the interior of the car. Compare Figure 4.

It will thus be seen that the body unit 10 with its flanges 32, brace 14, and members 35, 38, 41, 48 may be pre-assembled, and that, prior to its assembly with the front end unit, the body unit 10 may be completely equipped, trimmed, and painted, with the possible exception of the outside paint at the few places for the final assembly welds. Similarly, the front end unit 11 may be completely assembled, equipped, and painted except for the few locations for the final assembly welds, and it may be pre-assembled with parts of running and driving gear.

It is obvious that the final assembly joints can be made conveniently and quickly because they are all accessible from the outside and merely require short-throated welding tools.

The length of the final assembly seams is such as to insure the required transfer of stresses from one unit to the other without stress concentrations. Indeed, in regard to the stress transfer and strength, the new construction, for all practical intents and purposes, need not be different from known constructions which, however, require reaching into the interior of the body for making the final assembly joints and which, therefore, do not permit the finishing of the body prior to the final assembly. The invention removes, consequently, a serious obstacle in the way of the more general adoption of the combined body and chassis principle by permitting finishing the body units in the same manner and to the same extent as customary for bodies that are then to be secured to a separate chassis.

The invention is not restricted to the illustrated embodiment. For instance, the application of the invention to different types, designs, and constructions of self-supporting bodies will call for modifications and adaptations which will easily occur to those skilled in the art. Another example of a modification is the attachment of the members of the end structure to the body unit separately or as smaller sub-assembly units, such as in the form of two separate units each comprising one sill, wheel housing, and inclined brace. It will also be understood that the invention is not necessarily restricted to the connection between a middle or body unit and a front unit but may also be applied to the connection between the body unit and a rear unit.

What is claimed is:

1. Final assembly joints between a pre-assembled multi-piece end unit and a pre-assembled multi-piece middle unit of a self-supporting automobile body, the middle unit forming the load body and being closed as a pre-assembled part thereof by a structural transverse wall in the region to be adjoined by the end unit, and the end unit projecting longitudinally beyond the middle unit upon final assembly of the units with each other and constituting an extension of and completing the body, the joints comprising throughout elongated webs provided on and outwardly projecting beyond said closed region of said middle unit and mating webs on said end unit, said webs overlappingly engaging each other in final assembly of said end unit and said middle unit and being accessible on the outside of said middle unit to tools for securing said webs together in their regions of overlap.

2. Final assembly joint between a pre-assembled end unit and a pre-assembled middle unit of a self-supporting automobile body, each of said units being pre-assembled of a multiplicity of individually manufactured parts, the middle unit forming the load body and being closed as pre-assembled part thereof by a structural transverse wall in the region to be adjoined by the end unit, and the end unit projecting longitudinally beyond the middle unit upon final assembly of the units with each other and forming an extension of and completing the body, a separate member secured to and outwardly projecting beyond the surface of said transverse wall of said middle unit, said end unit having a web overlappingly engaging by a margin said member in final assembly so that the region of overlap is accessible to tools for securing said member and said web together.

3. In a self-supporting automobile body, final assembly means between a pre-assembled main unit forming the body proper and a pre-assembled end unit adapted for connection with parts of the running gear, said main unit having a transverse outer panel, sheet metal sections having webs extending transversely to said panel and pre-assembled therewith along one of their margins, flanges on the opposite margins of said webs, flanges on parts of said end unit arranged for overlapping engagement with said flanges on said webs, said overlapping flanges being accessible on the outside of said main unit for pincer type connecting tools when main unit and end unit are in final assembly position.

4. In a self-supporting automobile body, final assembly means between a pre-assembled main unit forming the body proper and a pre-assembled end unit adapted for connection with parts of the running gear, said main unit having a floor panel and an end wall, sheet metal sections having webs extending transversely to said floor panel and end wall respectively and pre-assembled with them by flanges along one of their margins, further flanges on the opposite margins of said webs, flanges on side sills and walls of said end unit arranged for overlapping engagement by said further flanges of said main unit, said overlapping flanges being accessible on the outside of said main unit for pincer type connecting tools when main unit and end unit are in final assembly position.

5. In an automobile body: a main unit forming the body proper and an end unit; said main unit having an outer panel; said end unit having a frame member overlapping in final assembly position the outside of said panel; a laterally outwardly directed flange on said frame member of said end unit, said flange being spaced from said panel; a member projecting outwardly from said panel, forming part of said main unit and having a flange overlappingly engaging said flange on said end unit; said overlapping flanges being openly accessible outside of said main unit for the application of final assembly means structurally tying said overlapping flanges and thereby said units together.

6. In an automobile body, a transverse outer panel, an elongated channel section secured by its bottom wall to the outside of said panel; a hollow-section frame member having its one side telescopingly fitted and secured in a second channel section; said second channel section fitting between the side walls of said first channel section member; both channel section members having outwardly directed marginal flanges overlappingly secured to each other, thereby connecting said frame member to said panel.

7. In a self-supporting automobile body, a pre-assembled main unit having a floor panel; an elongated inverted channel section secured by its bottom wall to the underside of said panel and extending in the longitudinal direction of the body; a hollow-section sill forming part of a unit pre-assembled separately from said main unit; said sill having its upper part telescopingly fitted and secured in a second invert channel section member; said second channel section member fitting between the side walls of said first channel section member; both channel section members having outwardly directed flanges overlappingly secured to each other, thereby connecting said sill to said panel.

8. In an automobile body, especially of the self-supporting type: an outer panel; a pair of elongated webs transversely spaced from each other, projecting outwardly from said panel and being secured thereto by one of their margins; flanges along the outer margins of said webs extending in opposite directions away from each other; a frame member provided on opposite sides with laterally directed flanges generally paralleling and spaced from the longitudinal edges of the member; said frame member fitting between said webs; said flanges on said webs and on said frame member overlapping and being secured to each other, thereby connecting said frame member to said panel.

9. In a self-supporting automobile body: a pre-assembled body unit and a pre-assembled front end unit; said body unit comprising as structural elements a pair of side sills, a floor panel secured along its side margins to said sills, a transverse brace having a web inter-connecting said side sills and secured to the underside of said floor panel rearwardly of its front margin, a toe-board panel and a dash-board panel in extension of said floor panel, and a cowl secured along its margins to said toe- and dash-board panels; said front end unit comprising side sill members transversely spaced from each other less than the distance between said side sills of said body unit, wheel housing walls secured along their lower margins to said side sill members, said side sill members projecting rearwardly beyond said wheel housing walls, and inclined braces mainly formed by transverse webs secured by their outer margins to the insides of said wheel housings, said inclined braces having one of their ends secured to the side sill members near the front ends thereof and extending upwardly and rearwardly; the rearwardly projecting parts of said sill members underlying in final assembly position said floor panel and abutting said transverse brace and being provided with laterally projecting generally horizontal flanges downwardly spaced from its top surface and with vertically arranged flanges along its rear margins; the rear margins of said wheel housings being in final assembly position forwardly spaced from said dash-board panel; webs forwardly projecting from said dash-board panel and forming part of said body unit, said last named webs overlappingly engaging the rear margins of said wheel housings and said inclined braces and being secured thereto in final assembly; said floor having downwardly projecting members with lateral horizontal flanges overlappingly engaging said horizontal flanges on said sill members and being secured to them in final assembly; and said vertical flanges of said sill members being overlappingly secured to said web of said transverse brace in final assembly.

10. Method of final assembly between a pre-assembled end unit and a pre-assembled middle unit of a self-supporting automobile body, the middle unit forming the load body and being closed in its pre-assembly by a structural transverse wall in the region to be adjoined by the end unit, and the end unit projecting longitudinally beyond the middle unit upon final assembly of the units with each other and forming an extension of and completing the body: the step of providing outwardly projecting elongated webs on said middle unit in the pre-assembly thereof; the step of providing mating elongated webs on said end unit in the pre-assembly thereof; the step of bringing said units together so that their webs overlappingly engage each other; and the step of applying on the outside of said middle unit tools to said overlapping webs for securing them to each other.

ALEXANDER R. LINDSAY.

References Cited in the file of this patent

UNITED STATES PATENTS

| Number | Name | Date |
|---|---|---|
| 1,816,333 | Ledwinka | July 28, 1931 |
| 1,855,429 | Toncray | Apr. 26, 1932 |
| 2,488,471 | Kramer et al. | Nov. 15, 1949 |